(12) United States Patent
Wu et al.

(10) Patent No.: US 9,229,408 B2
(45) Date of Patent: Jan. 5, 2016

(54) TONER ESTIMATION MECHANISM

(71) Applicants: Chai Wah Wu, Hopewell Junction, NY (US); Barry M. Trager, Yorktown Heights, NY (US); Mikel J. Stanich, Longmont, CO (US); Kartheek Chandu, Longmont, CO (US)

(72) Inventors: Chai Wah Wu, Hopewell Junction, NY (US); Barry M. Trager, Yorktown Heights, NY (US); Mikel J. Stanich, Longmont, CO (US); Kartheek Chandu, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 13/777,550

(22) Filed: Feb. 26, 2013

(65) Prior Publication Data

US 2014/0240803 A1    Aug. 28, 2014

(51) Int. Cl.
*H04N 1/46* (2006.01)
*G03G 15/00* (2006.01)
*G06K 15/02* (2006.01)
*H04N 1/00* (2006.01)
*G06K 15/12* (2006.01)

(52) U.S. Cl.
CPC .......... *G03G 15/556* (2013.01); *G06K 15/1823* (2013.01); *H04N 1/00127* (2013.01); *H04N 1/00167* (2013.01); *H04N 1/00188* (2013.01); *G06K 15/12* (2013.01)

(58) Field of Classification Search
USPC ........................................................ 358/504
See application file for complete search history.

(56) References Cited

U.S. PATENT DOCUMENTS

| 5,349,377 | A | * | 9/1994 | Gilliland | H04N 1/00002 347/131 |
|---|---|---|---|---|---|
| 5,923,356 | A | | 7/1999 | Gibson | |
| 6,515,756 | B1 | * | 2/2003 | Mastie et al. | 358/1.15 |
| 6,516,160 | B1 | | 2/2003 | Rodriguez | |
| 6,810,218 | B1 | | 10/2004 | Wong et al. | |
| 6,895,193 | B2 | | 5/2005 | Takamatsu et al. | |
| 7,565,085 | B2 | | 7/2009 | Okuyama et al. | |
| 7,804,629 | B2 | | 9/2010 | Jacobs et al. | |
| 2011/0013039 | A1 | * | 1/2011 | Aisaka | H04N 5/142 348/222.1 |
| 2012/0114361 | A1 | * | 5/2012 | Nagai | 399/81 |
| 2012/0218574 | A1 | * | 8/2012 | Fukuda | H04N 1/6097 358/1.9 |

FOREIGN PATENT DOCUMENTS

| JP | 06242676 A | 9/1994 |
|---|---|---|
| JP | 2004163885 | 6/2004 |
| JP | 2004287442 | 10/2004 |

* cited by examiner

*Primary Examiner* — King Poon
*Assistant Examiner* — Andrew H Lam
(74) *Attorney, Agent, or Firm* — Blakely, Sokoloff, Taylor & Zafman LLP

(57) ABSTRACT

A method is disclosed. The method includes estimating a quantity of toner to be used to print a job at a printer by calculating a buildup of toner at edges of data on each page of the print job.

18 Claims, 3 Drawing Sheets

TONER ESTIMATION MECHANISM

FIELD OF THE INVENTION

This invention relates generally to the field of printing systems. More particularly, the invention relates to estimating toner usage in an electrophotographic printing system.

BACKGROUND

Electrophotographic printers produce images that are written by a beam of light onto a photoconductive drum (or band) that has a uniform electric charge over its surface. The action of the light beam produces a charge pattern on the photoconductor, which is then developed by applying particles of toner that are attracted to the image but are repelled by the background. The image is then transferred to a medium (e.g., paper) by pressing the medium against the drum and applying an electric field on the opposite side of the medium as the toner layer. Toner is typically fixed to the medium by heat and/or pressure.

In high speed production printer applications it is often desirable to estimate an amount of toner used to print a digital job using a specific electrophotographic printer. However, current toner estimation methods are inaccurate. Specifically, an accounting for the buildup of toner near edges within an image is the component missing in current methods that is required for an accurate estimate. The toner deposited at the edges is created by "fringe field development". Further, the amount of toner at an edge cannot be described by a simple model since toner build-up varies widely depending on data in the vicinity.

Accordingly, an accurate toner estimation mechanism for an electrophotographic printer is desired.

SUMMARY

In one embodiment, a method is disclosed. The method includes estimating a quantity of toner to be used to print a job at a printer by calculating the total amount of toner for each page of a print job, including the buildup of toner at edges of data. The sum of toner from each page is then the total toner usage for the print job.

In another embodiment, a system is disclosed. The system includes a toner estimation unit to estimate a quantity of toner to be used to print a job at a printer by calculating the total amount of toner for each page of a print job, including the buildup of toner at edges of data. The sum of toner from each page is then the total toner usage for the print job.

BRIEF DESCRIPTION OF THE DRAWINGS

A better understanding of the present invention can be obtained from the following detailed description in conjunction with the following drawings, in which.

DETAILED DESCRIPTION

A toner estimation mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
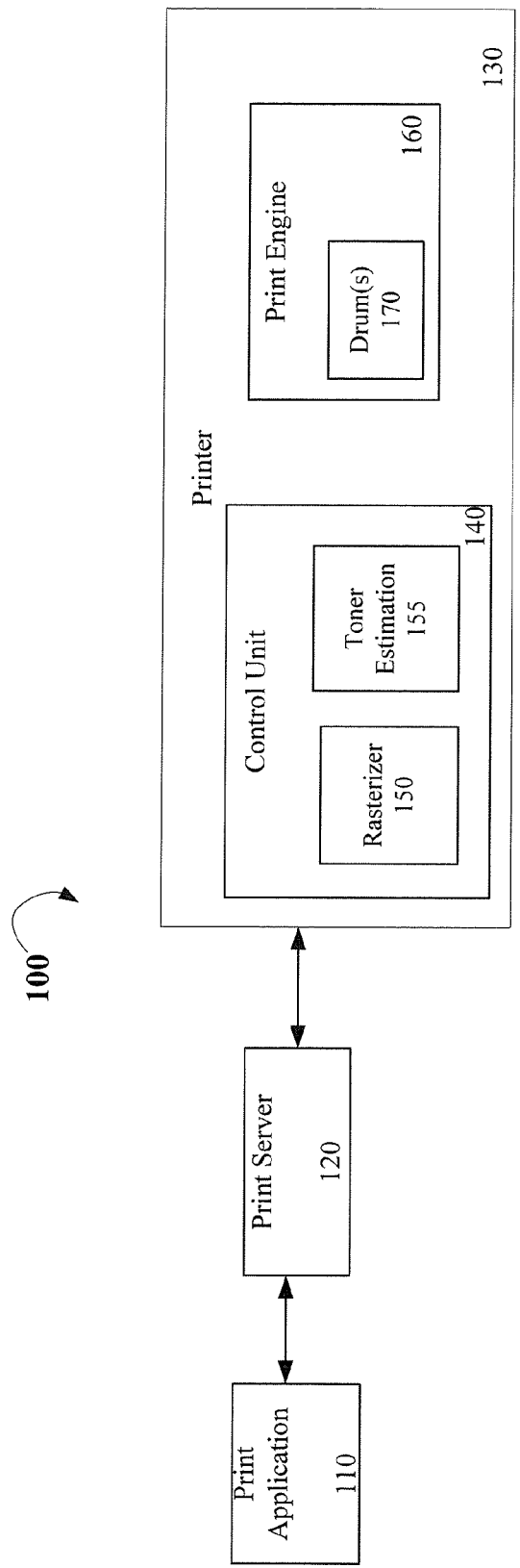
FIG. 1 illustrates one embodiment of a printing system.

FIG. 1 illustrates one embodiment of a printing system 100. Printing system 100 includes a print application 110, a print server 120 and a printer 130. Print application 110 makes a request for the printing of a document. In one embodiment, print application 110 provides a print job data stream to print server 120 in a presentation format (e.g., Advanced Function Printing, Post Script, etc.)

Print server 120 processes pages of output that mix all of the elements normally found in presentation documents (e.g., text in typographic fonts, electronic forms, graphics, image, lines, boxes, and bar codes). In one embodiment, the data stream is composed of architected, structured fields that describe each of these elements.

According to one embodiment, printer 130 includes a control unit 140 and print engine 160. In such an embodiment, print server 120 communicates with control unit 140 in order to integrate with the capabilities and command set of printer 130, and to facilitate interactive dialog between the print server 120 and printer 130. In one embodiment, the dialog between the print server 120 and printer 130 is provided according to a device-dependent bi-directional command/data stream.

Control unit 140 processes and renders objects received from print server 120 and provides sheet maps for printing to print engine 160. Control unit 140 includes a rasterizer 150 to prepare pages for printing. Particularly, rasterizer 150 includes a raster image processor (RIP) that converts text and images into a matrix of pixels (bitmap) that will be printed on a page at print engine 160.

In one embodiment, print engine 160 is an electrophotographic print engine having one or more photoconductive drums 170 having a surface with a uniform electric charge on which images are written by a beam of light. As discussed above, the image is transferred to a medium by pressing the medium against a drum 170 and applying an electric field to the reverse side of the medium to transfer toner to the medium. The medium with the transferred image is then further processed to affix the toner to the medium, for example using a hot roll or radiant fusing.

According to one embodiment, the control unit also includes a toner estimation unit 155. In such an embodiment, toner estimation unit 155 computes a quantity of toner to be used to print a job by implementing a model to describe the toner transferred to the image, including the buildup of toner near the edges of printed data. Concentrating on a single PEL of image data and the toner required to print that PEL, the model accounts for the contribution from all of the digital data in the vicinity to produce an accurate model for the toner at that PEL.

Figure 2:
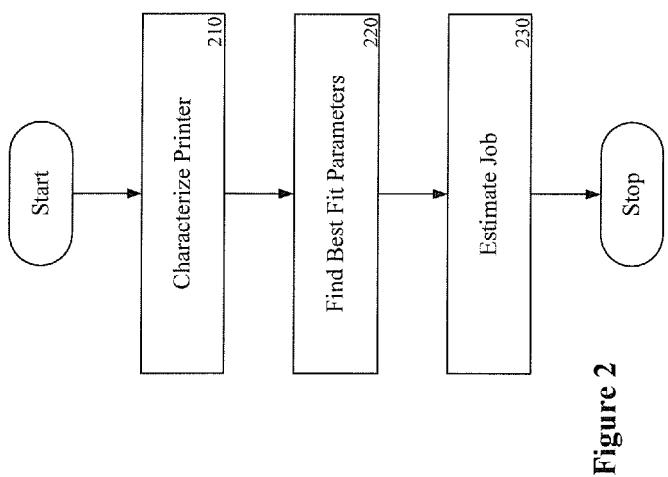
FIG. 2 is a flow diagram illustrating one embodiment for performing toner usage estimation.

FIG. 2 is a flow diagram illustrating one embodiment for performing toner usage estimation at printer 130. At processing block 210, printer 130 is characterized for a range of spatial frequencies. In one embodiment, print targets having a range of spatial frequencies are employed to measure the printer. Lines can also be tested having different orientations to determine characteristics for each direction. For the "scan" direction, lines aligned along the direction of the scanning LASER exposure spot can be used. Line patterns oriented along the direction of paper movement can be used to measure "process" direction characteristics.

In such an embodiment, printer 130 is stopped after each target is printed, while the developed image is still on the drum, but prior to being transferred to paper. Subsequently, the toner used to generate the image is vacuumed and weighed. This process is repeated for the entire set of targets, which may range from single pixel (or pel) on/off patterns to solid areas.

The amount of weighed toner correlates to spatial frequency since test masters used to characterize the printer process have a variety of line widths and hence different spatial frequencies. Such a correlation provides a means to test the process over a large range of spatial frequencies from one pel on, one pel off (e.g., highest spatial frequency that can be created) to solid areas (zero spatial frequency). The spacing of the lines is generally set to be the same as the width of the lines.

At processing block 220, a best-fit model is created between the printer characterization and a model exponential function to accurately fit the measured data. According to one embodiment, the model exponential function is represented as a simplified model of the Xerographic Development of Residual Voltage Variations, as represented by:

$$M(\omega_x) = K_1 \cdot e^{-a_1 \cdot \sqrt{\omega_x}} - K_2 \cdot e^{-a_2 \cdot \sqrt{\omega_x}}$$

In one embodiment, the above one-dimensional model is extended to two-dimensions such that:

$$M(\omega_x, \omega_y) = K_1 e^{-a_1 \sqrt{\omega_x^2 + \omega_y^2}} - K_2 e^{-a_2 \sqrt{\omega_x^2 + \omega_y^2}}$$

In a further embodiment, an initial best-fit model is created using an estimation of the exponential parameters for the two-dimensional (2D) equation. Subsequently, printed pels of the test images may be inverted to force black printed pels to a value of 1. In one embodiment, the resulting digital image for each test master is convolved with a convolution kernel that corresponds to the current 2D model to produce an initial toner usage estimate for each pel. In this case the convolution kernel uses an initial estimate of the model parameters.

Further, a correction is applied to a toner usage image, created by the convolution, to account for the fact that some toner deposition values will be negative due to the convolution kernel having negative values at some points. The negative toner deposition values are ignored since there cannot be negative toner coverage at any point due to the fact that toner deposition must always be a positive value to represent a real printer system. Values that are zero represent the toner that occurs in the background. Thus, the negative toner deposition values are clipped to zero toner deposition. In another embodiment to further improve the accuracy clipping of negative and zero values is not done to zero but rather a small positive value representing the toner deposition for the background for each PEL. This value can be determined experimentally using an image with no PELs at any point.

The convolved/clipped result is an estimate for the toner deposition at each point on the digital test images. Accordingly, the sum for all of the pels represents an estimate of the total toner usage for a test image when printed.

To create a block box model of the printer toner deposition the process of printing and measuring is repeated for all of the test masters, including test masters having alternate orientations of the line patterns. Test masters not having line patterns may also be included in the suite of images. These might include text or even halftone image. Non-linear optimization is subsequently performed to determine the best model parameters so that the estimated toner usage matches the actual toner usage for each test image. The optimization is repeated until the parameters of the model converge. Once the model converges, the estimated toner for each test master and the measured toner can be compared to determine the accuracy of the model for each test image.

At processing block 230, upon receiving a print job at printer 130, the best-fit model is implemented to perform toner estimation for print jobs received by processing each page image with the best fit model for the printer development. The results for each page are combined to estimate the toner usage for the job. In one embodiment, the processing is performed for each image on each page of a job. In another embodiment multiple sets of parameters are stored each one for different combinations of parameters for the EP process. For example different dark, white and bias voltages, etc. The estimation block in this case accesses the proper parameters based on the known parameters of the printer. In particular this can be used to account for printer parameters which are varied to change the optical density for solid area printing.

Figure 3:
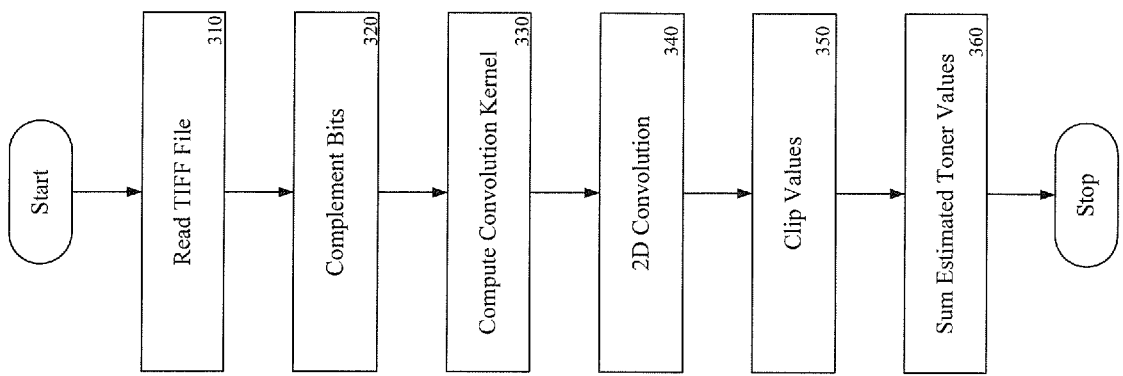
FIG. 3 is a flow diagram illustrating one embodiment of calculating toner usage for a single image.

FIG. 3 is a flow diagram illustrating one embodiment of calculating toner usage for a single page image. Referring to FIG. 3, a TIFF file representing the image bitmap is captured from Rasterizer 150 to form the input at processing block 310. At processing block 320, bits in the file are complemented, if required, so that 1 represents a black pixel. At processing block 330, the convolution kernel is computed by evaluating the filter function on a 400×400 pixel matrix. In one embodiment, this is performed by a function rect which is passed the x and y grid along with the model parameters. The "rect" function creates the convolution kernel. A clipped version of the kernel complemented, if required, so that 1 represents a black pixel. At processing block 330, the convolution kernel is computed by evaluating the filter function on a 400×400 pixel matrix. In one embodiment, this is performed by a function rect which is passed the x and y grid along with the model parameters. The "rect" function creates the convolution kernel. A clipped version of the kernel represents the distribution of toner from a single black printed PEL. X and y grid values designate the points spatially for each PEL where the convolution kernel is computed. Combining grid point vectors from x and y give the PEL locations for all of the PELs in the convolution array. This convolution kernel without clipping has negative values that represents the influence of the negative and positive tangential electric fields surrounding a PEL. Model parameters are also passed to the rect function which define the fundamental shape of the convolution kernel.

Convolution Kernel is inverse fourier transform of system transfer function:

$$M(x, y) = \frac{1}{4\pi^2} \int_{-\infty}^{\infty} \int_{-\infty}^{\infty} M(\omega_x, \omega_y) e^{j(x\omega_x + y\omega_y)} d\omega_x d\omega_y$$

If x and y have units of mm then $\omega_x$ and $\omega_y$ have units of radians per mm.

Since $M(\omega_x, \omega_y)$ is radially symmetric, we can convert to polar coordinates using:

$$\omega_x = \omega_r \cos\phi$$
$$\omega_y = \omega_r \sin\phi$$
$$\omega_r^2 = \omega_x^2 + \omega_y^2$$
$$x = r\cos\theta$$
$$y = r\sin\theta$$
$$r^2 = x^2 + y^2$$
$$M(r) = \frac{1}{4\pi^2}\int_0^\infty \int_0^{2\pi} M(\omega_r) e^{j r \omega_r (\cos\theta\cos\phi + \sin\theta\sin\phi)} \omega_r d\omega_r d\phi$$
$$M(r) = \frac{1}{4\pi^2}\int_0^\infty \int_0^{2\pi} M(\omega_r) e^{j r \omega_r \cos(\phi-\theta)} \omega_r d\omega_r d\phi$$
$$M(r) = \frac{1}{4\pi^2}\int_0^\infty \int_{-\theta}^{2\pi-\theta} M(\omega_r) e^{j r \omega_r \cos\phi} \omega_r d\omega_r d\phi$$
$$M(r) = \frac{1}{4\pi^2}\int_0^\infty M(\omega_r) \left[\int_0^{2\pi} e^{j r \omega_r \cos\phi} d\phi\right] \omega_r d\omega_r$$

The expression in brackets can be expressed in terms of $J_0$, the zeroth order Bessel function of the first kind:

$$J_0(z) = \frac{1}{2\pi}\int_0^{2\pi} e^{jz\cos\phi} d\phi$$
$$M(r) = \frac{1}{2\pi}\int_0^\infty M(\omega_r) J_0(r\omega_r) \omega_r d\omega_r$$

This expression is known as a Hankel transform and can be explicitly evaluated to yield:

$$M(x, y) = \frac{1}{2\pi}\left(\frac{K_1 a_1}{(a_1^2 + x^2 + y^2)^{3/2}} - \frac{K_2 a_2}{(a_2^2 + x^2 + y^2)^{3/2}}\right)$$

The two dimensional response $V_0(x,y)$ to a rectangle with uniform value 1 with x ranging from $X_0$ to $X_1$ and y ranging from $Y_0$ to $Y_1$ is the convolution of $M(x,y)$ with the rectangle patch. We first observe that $U(x,y) = \iint M(x,y) dx\, dy$ is:

$$\iint M(x, y) dx\, dy = \frac{K_1}{2\pi}\mathrm{atan}\left(\frac{xy}{a_1\sqrt{a_1^2 + x^2 + y^2}}\right) - \frac{K_2}{2\pi}\mathrm{atan}\left(\frac{xy}{a_2\sqrt{a_2^2 + x^2 + y^2}}\right)$$

Then the two dimensional response $V_0(x,y)$ is:

$$V_0(x,y) = U(x-X_1, y-Y_1) - U(x-X_1, y-Y_0) - U(x-X_0, y-Y_1) + U(x-X_0, y-Y_0)$$

Based on the above equations the convolution kernel implemented in rect is the $V_0(x,y)$ where the $X_0, X_1, Y_0$ and $Y_1$ are the spatial values defining a black square of unit value corresponding to single black PEL on the matrix. and performs the convolutions, clips the negative values to 0, and then sums the resulting entries.

This final value is then linearly scaled to convert to micrograms of toner. At processing block 350, the values are clipped from the convolution to values zero and greater. At processing block 360, the estimated toner values for the entire image are summed.

Figure 4:
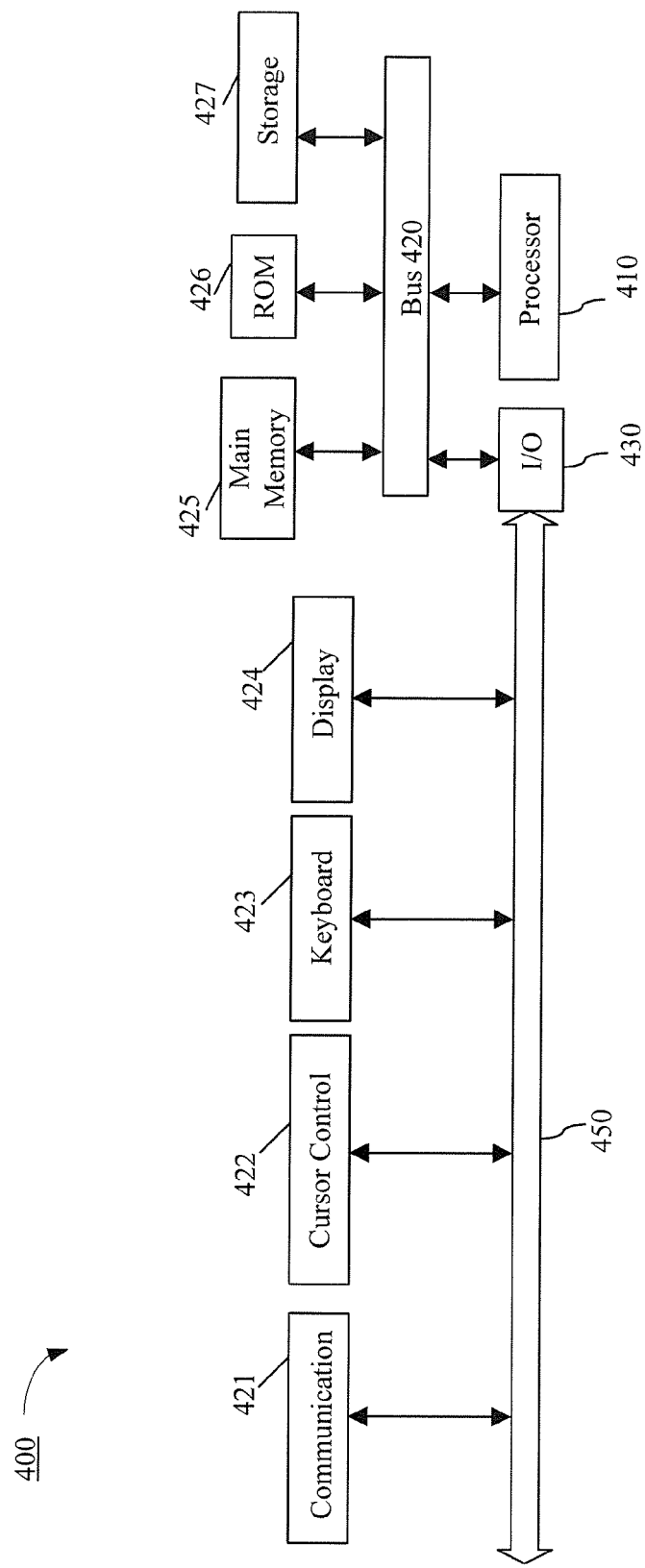
FIG. 4 illustrates one embodiment of a computer system.

FIG. 4 illustrates a computer system 400 on which print controller 140 and/or print server 120 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A non-transitory computer-readable medium including instructions, which when executed, causes a processor to perform:
   characterizing a range of spatial frequencies at a printer, wherein each spatial frequency correlates with a measured weight of toner;
   creating a best-fit model between the printer characterization and a model exponential function, including:

convolving each test image with a convolution kernel that corresponds to the model exponential function to produce an initial toner usage estimate for each pel;

receiving a print job at the printer; and estimating a quantity of toner to be used to print the print job by processing each image of each page of the print job with the best-fit model.

2. The computer-readable medium of claim 1 wherein characterizing the range of spatial frequencies is performed by analyzing a quantity of toner used to print one or more test images.

3. The computer-readable medium of claim 2 wherein creating the best-fit model comprises inverting printed pixels (pels) for each of the one or more to a value of 1.

4. The computer-readable medium of claim 1 wherein creating the best-fit model further comprises applying a correction to the toner usage deposition values to convert negative values to zero.

5. The computer-readable medium of claim 4 wherein creating the best-fit model further comprises performing a sum operation on the toner deposition values to represent an estimate of the total toner usage for the test image when printed.

6. The computer-readable medium of claim 5 wherein creating the best-fit model further comprises performing non-linear optimization on the total toner usage estimate to determine the best model parameters.

7. The computer-readable medium of claim 5 wherein creating the best-fit model further comprises comparing the total toner usage estimate and the quantity of toner used to print the test image.

8. The computer-readable medium of claim 1 wherein the processing of each image comprises:

receiving a TIFF file representing an image bitmap;

complementing bits in the TIFF file;

computing a convolution kernel; and performing a convolution with the image bitmap.

9. A system comprising:

a processor to process print jobs; and a memory device to store a toner estimation unit executed by the processor to characterize a range of spatial frequencies at a printer, wherein each spatial frequency correlates with a measured weight of toner, create a best-fit model between the printer characterization and a model exponential function, estimate a quantity of toner to be used to print the print job by processing each image of each page of the print job with the best-fit, wherein the frequency analysis performed for each image comprises receiving a TIFF file representing an image bitmap, complementing bits in the TIFF file, computing a convolution kernel and performing a convolution with the image bitmap.

10. The system of claim 9 wherein characterizing the range of spatial frequencies is performed by analyzing a quantity of toner used to print one or more test images.

11. The system of claim 9 wherein creating the best-fit model comprises applying a correction to the toner usage deposition values to convert negative values to zero, convolving a test image with a convolution kernel that corresponds to the model exponential function to produce toner deposition values for each pel and performing a sum operation on the toner deposition values to represent an estimate of the total toner usage for the test image when printed.

12. The system of claim 11 wherein creating the best-fit model comprises performing non-linear optimization on the total toner usage estimate to determine the best model parameters and comparing the total toner usage estimate and the quantity of toner used to print the test image.

13. A printer comprising a control unit to characterize a range of spatial frequencies at a printer, wherein each spatial frequency correlates with a measured weight of toner, create a best-fit model between the printer characterization and a model exponential function, receive a print job at the printer and estimate a quantity of toner to be used to print the print job by processing each image of each page of the print job with the best-fit model, wherein creating the best-fit model comprises convolving each test image with a convolution kernel that corresponds to the model exponential function to produce an initial toner usage estimate for each pel.

14. The printer of claim 13 wherein characterizing the range of spatial frequencies is performed by analyzing a quantity of toner used to print one or more test images.

15. The printer of claim 14 wherein creating the best-fit model comprises inverting printed pixels (pels) for each of the one or more to a value of 1.

16. The printer of claim 13 wherein creating the best-fit model further comprises applying a correction to the toner usage deposition values to convert negative values to zero.

17. The printer of claim 16 wherein creating the best-fit model further comprises performing a sum operation on the toner deposition values to represent an estimate of the total toner usage for the test image when printed.

18. The printer of claim 17 wherein creating the best-fit model further comprises performing non-linear optimization on the total toner usage estimate to determine the best model parameters.

* * * * *